(12) United States Patent  
Park et al.

(10) Patent No.: US 8,929,662 B2  
(45) Date of Patent: Jan. 6, 2015

(54) METHOD AND APPARATUS FOR GENERATING SUPER-RESOLUTION IMAGE USING PREDICTION AND STABILIZATION OF HIGH-FREQUENCY INFORMATION OF IMAGE

(75) Inventors: Jong-hyun Park, Seoul (KR); Se-hyeok Park, Seoul (KR); Moon-gi Kang, Seoul (KR); Ji-yong Kwon, Seoul (KR); Du-sic Yoo, Jeonbuk (KR); Seung-hoon Jee, Goyang-si (KR); Jae-hyun Kim, Suwon-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 178 days.

(21) Appl. No.: 13/524,682

(22) Filed: Jun. 15, 2012

(65) Prior Publication Data  
US 2012/0321200 A1    Dec. 20, 2012

(30) Foreign Application Priority Data

Jun. 15, 2011    (KR) .................. 10-2011-0057976

(51) Int. Cl.  
G06K 9/48    (2006.01)  
H04N 5/232    (2006.01)  
G06T 3/40    (2006.01)  
G06T 5/50    (2006.01)  
G06T 5/00    (2006.01)

(52) U.S. Cl.  
CPC .......... G06T 3/4053 (2013.01); H04N 5/23267 (2013.01); G06T 5/50 (2013.01); G06T 2207/10016 (2013.01); G06T 5/003 (2013.01)  
USPC .......................................... 382/199

(58) Field of Classification Search  
None  
See application file for complete search history.

(56) References Cited

U.S. PATENT DOCUMENTS

| | | | | |
|---|---|---|---|---|
| 5,351,305 A * | 9/1994 | Wood et al. | .................. | 382/128 |
| 5,495,536 A * | 2/1996 | Osbourn | ...................... | 382/199 |
| 6,323,855 B1 * | 11/2001 | Hamilton et al. | ............. | 345/418 |
| 7,515,747 B2 * | 4/2009 | Okutomi et al. | .............. | 382/167 |
| 7,715,658 B2 * | 5/2010 | Cho et al. | ...................... | 382/299 |
| 8,005,313 B2 * | 8/2011 | Wang et al. | .................. | 382/266 |
| 8,249,377 B1 * | 8/2012 | Banner et al. | ................. | 382/255 |
| 8,260,031 B2 * | 9/2012 | Yamashita | .................... | 382/144 |
| 8,452,122 B2 * | 5/2013 | Hitomi et al. | ................. | 382/275 |
| 8,594,447 B2 * | 11/2013 | Smith | .......................... | 382/255 |
| 2006/0164555 A1 * | 7/2006 | Klompenhouwer et al. | . | 348/625 |

OTHER PUBLICATIONS

Computer English Translation of Japanese Patent No. JP 2006-238032, pp. 1-16, Sep. 2006.*

* cited by examiner

*Primary Examiner* — Daniel Mariam  
(74) *Attorney, Agent, or Firm* — Sughrue Mion, PLLC

(57) ABSTRACT

Image restoration by restoring a high-frequency component of a deteriorated image. A high-frequency image information predicting and stabilizing method includes: determining a shooting area, which is a high-frequency area that includes an overly-restored high-frequency component, in an input image; predicting a high-frequency component of the input image by applying different deterioration models to the shooting area and a remaining area in the input image; and stabilizing a high-frequency component of an edge area by using an edge blur kernel determined to be parallel to an edge direction of the input image.

27 Claims, 10 Drawing Sheets

METHOD AND APPARATUS FOR GENERATING SUPER-RESOLUTION IMAGE USING PREDICTION AND STABILIZATION OF HIGH-FREQUENCY INFORMATION OF IMAGE

CROSS-REFERENCE TO RELATED PATENT APPLICATION

This application claims the benefit of Korean Patent Application No. 10-2011-0057976, filed on Jun. 15, 2011, in the Korean Intellectual Property Office, the disclosure of which is incorporated herein in its entirety by reference.

BACKGROUND

1. Field

Exemplary embodiments relate to an image restoration scheme for restoring a high-frequency component of a deteriorated image.

2. Description of the Related Art

Image systems may include a camcorder or a digital camera. Image systems may further include an image processing module to perform processes for improving image quality of images captured by a sensor.

A representative cause of image quality deterioration in image systems is a blur effect which decreases clarity of captured images. When a camera's focus is not matched to an object, when a camera's sensor is exposed for a long period of time, or when a camera motion occurs, the blur effect occurs in a captured image.

Thus, to improve image quality, a scheme of removing the blur effect is widely used. The blur removing scheme is employed in the image processing module of an image system to remove the blur effect from an image captured by a sensor.

Since customer demand for super-resolution images is increasing, the latest image systems tend to increase resolution of a sensor. The increase in the sensor's resolution may allow a resolution limit of the sensor to increase, thereby acquiring high definition images, which are not usually possible to achieve with low-resolution image sensors.

However, the blur effect generally occurring in image systems damages the detail information of images, which can be represented by a super-resolution image sensor. Thus, to acquire a super-resolution image having high image quality, the problem of the blur effect of the image needs to be addressed.

SUMMARY

The exemplary embodiments include a method and apparatus for predicting and stabilizing a high-frequency component of an image and generating a super-resolution image using the high-frequency component of the image.

According to an aspect of an exemplary embodiment, a high-frequency image information predicting method includes: determining a shooting area, which is a high-frequency area which includes an overly-restored high-frequency component, in an input image; determining a high-frequency component of an area other than the shooting area in the input image by using a first deterioration model; and determining a high-frequency component of the shooting area by using a second deterioration model.

According to another aspect of an exemplary embodiment a high-frequency image information stabilizing method includes: detecting an edge area and an edge direction by predicting directivity of an input image; determining an edge blur kernel for stabilizing a high-frequency component of the edge area to be parallel to the edge direction; and stabilizing a high-frequency component of the input image by using the edge blur kernel.

According to another aspect of an exemplary embodiment, a high-frequency image information predicting and stabilizing method includes: determining a shooting area, which is a high-frequency area which includes an overly-restored high-frequency component, in an input image; predicting a high-frequency component of the input image by determining a high-frequency component of an area other than the shooting area in the input image by using a first deterioration model and determining a high-frequency component of the shooting area by using a second deterioration model; determining an edge blur kernel for stabilizing a high-frequency component of an edge area to be parallel to an edge direction of the input image; stabilizing a high-frequency component of the input image by considering the edge direction of the edge area by using the edge blur kernel; and generating a restoration image by synthesizing the stabilized high-frequency component into the input image.

According to another aspect of an exemplary embodiment, a super-resolution image generating method includes: receiving a plurality of input images; determining a shooting area, which is a high-frequency area which includes an overly-restored high-frequency component, in each of the input images; determining a high-frequency component of an area other than the shooting area in each of the input images by using a first deterioration model and determining a high-frequency component of the shooting area by using a second deterioration model; determining an edge blur kernel for stabilizing a high-frequency component of an edge area to be parallel to an edge direction of an initial restoration image; stabilizing a high-frequency component of each of the input images by using the edge blur kernel; and generating a super-resolution image of the initial restoration image by using the stabilized high-frequency component of each of the input images.

According to another aspect of an exemplary embodiment, a high-frequency image information predicting apparatus includes: a shooting area determiner for determining a shooting area, which is a high-frequency area which includes an overly-restored high-frequency component, in an input image; a non-shooting area high-frequency component determiner for determining a high-frequency component of an area other than the shooting area in the input image by using a first deterioration model; and a shooting area high-frequency component determiner for determining a high-frequency component of the shooting area by using a second deterioration model.

According to another aspect of an exemplary embodiment, a high-frequency image information stabilizing apparatus includes: an edge detector for detecting an edge area and an edge direction by predicting directivity of an input image; an edge blur kernel determiner for determining an edge blur kernel for stabilizing a high-frequency component of the edge area to be parallel to the edge direction; and a high-frequency component stabilizer for stabilizing a high-frequency component of the input image by using the edge blur kernel.

According to another aspect of an exemplary embodiment, a high-frequency image information predicting and stabilizing apparatus includes: a shooting area determiner for determining a shooting area, which is a high-frequency area which includes an overly-restored high-frequency component, in an input image; a high-frequency component predictor for predicting a high-frequency component of the input image by determining a high-frequency component of an area other than the shooting area in the input image by using a first deterioration model and determining a high-frequency component of the shooting area by using a second deterioration model; an edge blur kernel determiner for determining an edge blur kernel for stabilizing a high-frequency component of an edge area to be parallel to an edge direction of the input image; a high-frequency component stabilizer for stabilizing a high-frequency component of the input image by considering the edge direction of the edge area by using the edge blur kernel; and a restoration image generator generating a restoration image by synthesizing the stabilized high-frequency component into the input image.

According to another aspect of an exemplary embodiment, a super-resolution image information predicting and stabilizing apparatus includes: an image input unit for receiving a plurality of input images; a shooting area determiner for determining a shooting area, which is a high-frequency area which includes an overly-restored high-frequency component, in each of the input images; a high-frequency component predictor for predicting a high-frequency component of each of the input images by determining a high-frequency component of an area other than the shooting area in each of the input images by using a first deterioration model and determining a high-frequency component of the shooting area by using a second deterioration model; an edge blur kernel determiner for determining an edge blur kernel for stabilizing a high-frequency component of an edge area to be parallel to an edge direction of an initial restoration image; a high-frequency component stabilizer for stabilizing a high-frequency component of each of the input images by using the edge blur kernel; and a super-resolution image generator for generating a super-resolution image of each of the input images by synthesizing the stabilized high-frequency component into each of the input images.

According to another aspect of an exemplary embodiment, there is provided a computer-readable recording medium storing a computer-readable program for implementing the high-frequency image information predicting method by using a computation processor.

According to another aspect of an exemplary embodiment, there is provided a computer-readable recording medium storing a computer-readable program for implementing the high-frequency image information stabilizing method by using a computation processor.

According to another aspect of an exemplary embodiment, there is provided a computer-readable recording medium storing a computer-readable program for implementing the high-frequency image information predicting and stabilizing method by using a computation processor.

According to another aspect an exemplary embodiment, there is provided a computer-readable recording medium storing a computer-readable program for implementing the super-resolution image generating method by using a computation processor.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION

A technique of predicting a high-frequency component of an input image in a method adaptive to a shooting area to minimize a shooting effect, which may occur in a process of restoring a high-frequency component of an image, according to an exemplary embodiment, is disclosed with reference to FIGS. 1 to 14.

In addition, a technique of stabilizing a high-frequency component of an image to stabilize the high-frequency component by considering an edge direction of the high-frequency component predicted in the process of restoring a high-frequency component of an image, according to an exemplary embodiment, is disclosed. The technique of stabilizing a high-frequency component of an image may preserve a high-frequency component perpendicular to the edge direction of the predicted high-frequency component.

In addition, a technique of predicting and stabilizing a high-frequency component of an image, which synthesizes a result of the high-frequency image component prediction according to an exemplary embodiment and a result of the high-frequency image component stabilization according to an exemplary embodiment, is disclosed. In addition, a technique of generating a super-resolution image by receiving a plurality of input images and synthesizing a result of performing the high-frequency image component prediction and stabilization according to an exemplary embodiment, into each of the plurality of input images, is disclosed.

Figure 1:
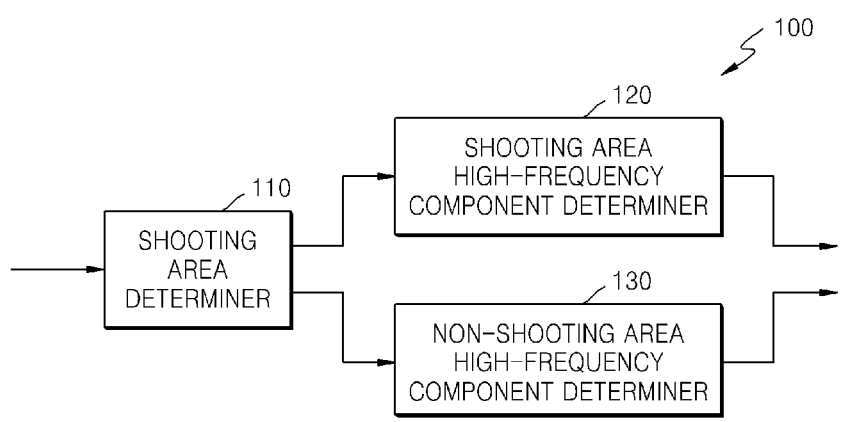
FIG. 1 is a block diagram of a high-frequency image information predicting apparatus according to an exemplary embodiment.

FIG. 1 is a block diagram of a high-frequency image information predicting apparatus 100 according to an exemplary embodiment.

Referring to FIG. 1, the high-frequency image information predicting apparatus 100 includes a shooting area determiner 110, a shooting area high-frequency component determiner 120, and a non-shooting area high-frequency component determiner 130.

The shooting area determiner 110 determines a shooting area, which is a high-frequency area in which a shooting effect occurs, in an input image. A shooting effect indicates a phenomenon in which a pixel value is excessively large or small when a high-frequency component of an image is overly restored. When the shooting effect occurs in an image, ringing artifacts may occur. The shooting area high-frequency component determiner 120 determines a high-frequency component of the shooting area in the input image. The non-shooting area high-frequency component determiner 130 determines a high-frequency component of an area (non-shooting area) other than the shooting area in the input image.

The high-frequency image information predicting apparatus 100 uses a deterioration model to predict a high-frequency component of the input image.

The deterioration model has a format obtained by mathematizing a blurring process that damages a high-frequency component of an image. A deteriorated image of an original image may be predicted by using the deterioration model. For example, the deterioration model may be a Point Spread Function (PSF) obtained by mathematizing a process that deteriorates an image when the image is captured. A high-frequency component of the image may be restored by applying an inverse function of the PSF to the deteriorated image.

A blur image obtained by adding a blur effect to an original image based on a deterioration model may lose more than a portion of a high-frequency component. The high-frequency image information predicting apparatus 100 may predict the high-frequency component of the input image by determining a difference between an actually deteriorated input image and a blur image deteriorated based on a deterioration model as the high-frequency component of the input image.

The high-frequency image information predicting apparatus 100 predicts the high-frequency component of the input image by considering an area in which the high-frequency component is overly restored in order to estimate and minimize the overly-restored high-frequency component. Thus, the high-frequency image information predicting apparatus 100 may identify the shooting area and the non-shooting area from the input image and determine the high-frequency component in each of the shooting area and the non-shooting area. To do this, the high-frequency image information predicting apparatus 100 may apply separate deterioration models to the shooting area and the non-shooting area.

The high-frequency image information predicting apparatus 100 may predict a high-frequency image component by using an actually deteriorated input image and a previous restoration image. An initial restoration image may be an image restored based on a blur image, which is deteriorated by applying a deterioration model to an original image, and an input image.

A difference component between a blur image deteriorated by applying a deterioration model to a previous restoration image and an actually deteriorated input image may be predicted as a high-frequency component of a current restoration image. The current restoration image may be determined by synthesizing the high-frequency component of the current restoration image into the previous restoration image.

The shooting area determiner 110 may determine a first deterioration model used to inversely predict the high-frequency component of the input image. The first deterioration model according to an exemplary embodiment may be a fundamental deterioration model for removing the blur effect of the input image and the initial restoration image.

The shooting area determiner 110 may predict an initial high-frequency component of the input image by using the first deterioration model. The predicted initial high-frequency component may be a high-frequency component of the input image or the initial restoration image. Thus, the shooting area determiner 110 may generate the initial restoration image of the input image by applying the first deterioration model to the input image.

The shooting area determiner 110 may detect an area which includes an overly-restored high-frequency component in the initial restoration image to determine the shooting area.

The shooting area determiner 110 may determine a shooting area that is an area where an overly-restored high-frequency component is to be suppressed in order to remove the shooting effect.

For example, in an area where a directionless high-frequency component having a wide bandwidth is large, such as a texture area or a noise area, the shooting effect or the ringing artifacts may be rarely viewed. However, if a high-frequency component in an edge area having a high-frequency component with clear directivity in a predetermined direction is overly restored, the shooting effect and the ringing artifacts may occur, so the edge area may not be correctly restored.

The shooting area determiner 110 may use the initial restoration image generated using the high-frequency component predicted using the first deterioration model to estimate an area where high-frequency component may be overly restored.

The shooting area determiner 110 may compare a current pixel with at least one neighboring pixel from among initial restoration pixels of the initial restoration image. If an initial restoration value of the current pixel is outside a range of initial restoration values of the at least one neighboring pixel, the current pixel may be predicted as a pixel of the area where a high-frequency component may be overly restored.

The shooting area high-frequency component determiner 120 determines a second deterioration model for the shooting area determined by the shooting area determiner 110. The shooting area high-frequency component determiner 120 may determine the second deterioration model to suppress the overly-restored high-frequency component in the shooting area.

For example, the shooting area high-frequency component determiner 120 may determine a deterioration model having a narrower range in an area to be blurred than the fundamental deterioration model as the second deterioration model.

The non-shooting area high-frequency component determiner 130 may determine a high-frequency component of the area other than the shooting area in the input image by using the first deterioration model.

The non-shooting area high-frequency component determiner 130 may acquire pixels deteriorated by performing blurring according to the first deterioration model for pixels in the shooting area in the initial restoration image. The non-shooting area high-frequency component determiner 130 may determine a difference component between the pixels deteriorated according to the first deterioration model and input image pixels of a corresponding area as the high-frequency component of the non-shooting area.

Similarly, for the shooting area in the initial restoration image, the shooting area high-frequency component determiner 120 may also determine a difference component between pixels deteriorated according to the second deterioration model and input image pixels of a corresponding area as the high-frequency component of the shooting area.

Thus, the high-frequency component of the shooting area may be predicted by suppressing the overly-restored high-frequency component by using the second deterioration model, and the damaged high-frequency component of the remaining area may be predicted by using the first deterioration model that is the fundamental deterioration model.

The high-frequency image information predicting apparatus 100 may use a restoration image determined in a previous computation period to determine a restoration image of a current computation period when iterating a computation period according to an iterative method. For example, the high-frequency image information predicting apparatus 100 may determine the restoration image of the current computation period by adding a high-frequency component predicted in the current computation period to the restoration image determined in the previous computation period. In this case, the high-frequency image information predicting apparatus 100 may apply a deterioration model to the previous restoration image generated in the previous computation period to model a blur image to which the deterioration model is applied.

Figure 2:
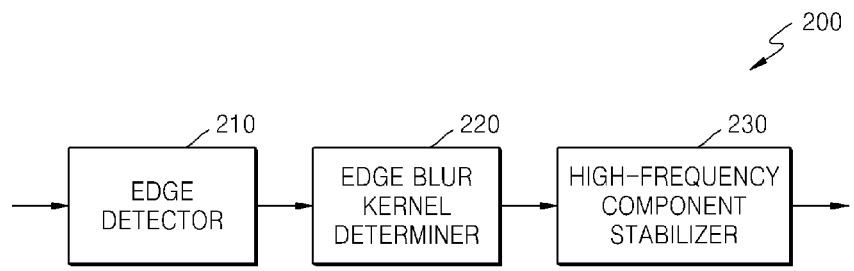
FIG. 2 is a block diagram of a high-frequency image information stabilizing apparatus according to an exemplary embodiment.

FIG. 2 is a block diagram of a high-frequency image information stabilizing apparatus 200 according to an exemplary embodiment.

Referring to FIG. 2, the high-frequency image information stabilizing apparatus 200 stabilizes a high-frequency component of an input image. In particular, the high-frequency image information stabilizing apparatus 200 is used in an image processing process for removing a blur effect to prevent a phenomenon whereby a high-frequency component perpendicular to an edge direction of a high-frequency component predicted in a previous operation is damaged. To do this, the high-frequency image information stabilizing apparatus 200 stabilizes the high-frequency component by considering the edge direction in the input image.

The high-frequency image information stabilizing apparatus 200 includes an edge detector 210, an edge blur kernel determiner 220, and a high-frequency component stabilizer 230. The edge detector 210 detects an edge area and an edge direction by predicting directivity of an input image. The edge blur kernel determiner 220 determines an edge blur kernel for the edge area detected from the input image. The high-frequency component stabilizer 230 stabilizes a high-frequency component of the input image by using the edge blur kernel determined by the edge blur kernel determiner 220.

For example, a 2-dimensional (2D) covariance relationship between neighboring pixels may indicate whether the number of pixels arranged in a row increase or decrease regularly or irregularly. Thus, the edge detector 210 may determine the edge area and the edge direction based on a 2D covariance relationship between pixels in a predetermined area of the input image.

The edge blur kernel determiner 220 may determine the edge blur kernel by considering the edge area and the edge direction detected by the edge detector 210.

The edge blur kernel determiner 220 may determine the edge blur kernel for stabilizing a high-frequency component of the edge area to be parallel to the edge direction detected by the edge detector 210.

For example, a blur kernel for an area other than the edge area may be determined as an anisotropic kernel without considering directivity of an image or an isotropic kernel. On the other hand, the edge blur kernel determiner 220 may determine a kernel to be applied to an area that is long in parallel to the edge direction and narrow in a direction perpendicular to the edge direction as the edge blur kernel.

The high-frequency component stabilizer 230 stabilizes the high-frequency component of the input image by using the edge blur kernel determined by the edge blur kernel determiner 220.

The edge blur kernel may be determined by using a tool for detecting the edge area and the edge direction. For example, the edge detector 210 may determine the edge direction of the input image by using a covariance matrix including a horizontal gradient component of the input image and a vertical gradient component of the input image. The edge blur kernel determiner 220 may determine the edge blur kernel in a shape of an oval having a long axis in a direction parallel to the edge direction and a short axis in a direction perpendicular to the edge direction.

To stabilize the high-frequency component of the input image, the high-frequency image information stabilizing apparatus 200 may additionally perform an operation of receiving a high-frequency component predicted for an initial restoration image and removing a blur effect, which may occur in a direction perpendicular to an edge direction, from an edge high-frequency component of the predicted high-frequency component.

In this case, a fundamental blur kernel for the deterioration model used in a high-frequency image component predicting method may be used as the blur kernel for the area other than the edge area. However, the high-frequency image information stabilizing apparatus 200 may determine the edge blur kernel for the edge area regardless of the fundamental blur kernel for the deterioration model. That is, the edge blur kernel determiner 220 may determine the edge blur kernel as the kernel to be applied to an area that is long in parallel to the edge direction and narrow in a direction perpendicular to the edge direction, independently to the fundamental blur kernel for the deterioration model.

Thus, the high-frequency image information stabilizing apparatus 200 may restore the high-frequency component of the input image to preserve an edge component by not applying a blur kernel in a direction crossing the edge direction in the edge area and maximizing an effect of stabilizing the high-frequency component in a direction parallel to the edge direction, by using the edge blur kernel determined by the edge blur kernel determiner 220 for which the edge direction is considered.

The high-frequency image information stabilizing apparatus 200 may use a restoration image determined in a previous computation period to determine a restoration image of a current computation period when iterating a computation period according to the iterative method. For example, the high-frequency image information stabilizing apparatus 200 may determine the restoration image of the current computation period by adding a high-frequency component restored in the current computation period to the restoration image in the previous computation period. In this case, the high-frequency image information stabilizing apparatus 200 may apply a deterioration model to the previous restoration image restored in the previous computation period to model a blur image to which the deterioration model is applied.

Figure 3:
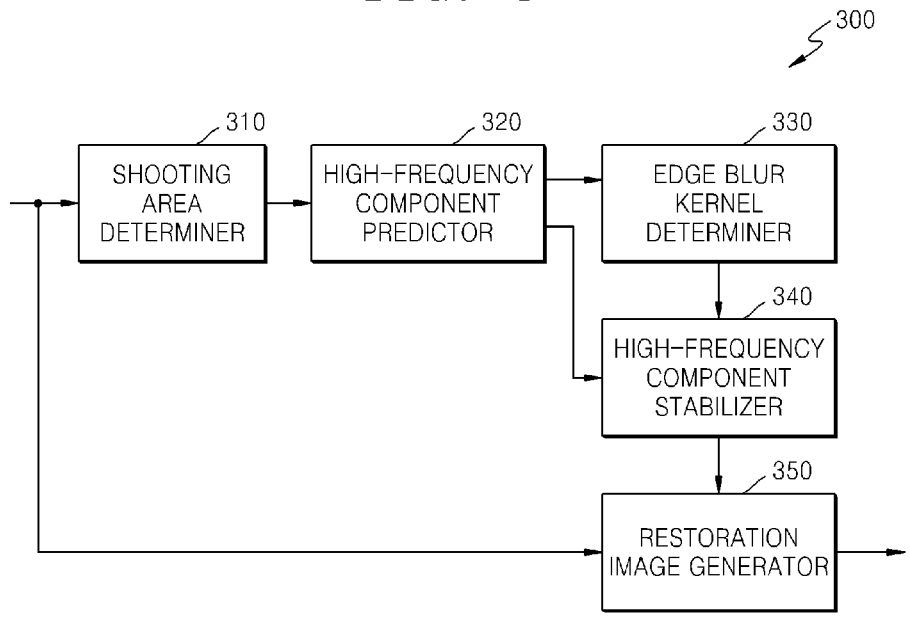
FIG. 3 is a block diagram of a high-frequency image information predicting and stabilizing apparatus according to an exemplary embodiment.

FIG. 3 is a block diagram of a high-frequency image information predicting and stabilizing apparatus 300 according to an exemplary embodiment.

Referring to FIG. 3, the high-frequency image information predicting and stabilizing apparatus 300 includes a shooting area determiner 310, a high-frequency component predictor 320, an edge blur kernel determiner 330, a high-frequency component stabilizer 340, and a restoration image generator 350.

The high-frequency image information predicting and stabilizing apparatus 300 predicts a high-frequency component in each of a shooting area and a general area by using a deterioration model and stabilizes a high-frequency image component with respect to the predicted high-frequency components. The high-frequency image information predicting and stabilizing apparatus 300 may generate a restoration image in which the high-frequency image component is restored by synthesizing the restored high-frequency component into an initial image.

The shooting area determiner 310 may determine a shooting area in an input image or an initial restoration image. The shooting area determiner 310 may determine the first deterioration model for predicting high-frequency image information and detect the shooting area from a high-frequency image component determined by using the first deterioration model.

The high-frequency component predictor 320 may predict a high-frequency component of the input image by using the first deterioration model and the second deterioration model acquired by the shooting area determiner 310.

The high-frequency component predictor 320 may determine a high-frequency component acquired by applying the first deterioration model to an area other than the shooting area in the input image as a high-frequency component of the remaining area. The high-frequency component predictor 320 may determine a high-frequency component acquired by applying the second deterioration model to the shooting area as a predicted high-frequency component of the shooting area.

The edge blur kernel determiner 330 determines an edge blur kernel for stabilizing a high-frequency component to be parallel to an edge direction by considering an edge component of the input image.

The blur kernel based on the fundamental deterioration model according to an exemplary embodiment may be applied to an area other than an edge area. On the other hand, the edge blur kernel according to an exemplary embodiment is a kernel applied to the edge area.

The edge blur kernel determiner 330 may determine the blur kernel for the area other than the edge area, by using the first deterioration model or the second deterioration model. For example, the blur kernel may be determined as a kernel corresponding to a transpose matrix of the first deterioration model or the second deterioration model.

However, the edge blur kernel determiner 330 may determine the edge blur kernel for which the edge area is considered, independently of the deterioration model. The edge blur kernel determiner 330 may detect the edge area and the edge direction by predicting directivity of the input image and determine the edge blur kernel for stabilizing a high-frequency component in a direction perpendicular to the edge direction with respect to the predicted high-frequency components.

For example, the edge blur kernel may be determined as a kernel having an area to which the kernel is applied, the area being long in parallel to the edge direction and narrow in a direction perpendicular to the edge direction.

The high-frequency component stabilizer 340 stabilizes a high-frequency component of the input image by using the blur kernel or the edge blur kernel determined by the edge blur kernel determiner 330. The high-frequency component stabilizer 340 may stabilize high-frequency information while minimizing damage to a high-frequency component of the edge area by using the edge blur kernel. The high-frequency component stabilizer 340 may stabilize a high-frequency component of the area other than the edge area, by using the blur kernel determined based on the first deterioration model or the second deterioration model.

The restoration image generator 350 generates a restoration image by synthesizing the high-frequency component restored by the high-frequency component stabilizer 340 into the initial restoration image.

Thus, the high-frequency image information predicting and stabilizing apparatus 300 may predict an overly-restored high-frequency component in which the shooting effect is minimized by separately determining a deterioration model for each of the shooting area and the remaining area and stabilize the high-frequency component to preserve the edge component by using the edge blur kernel for which the edge direction of the edge area is considered. In addition, the high-frequency component may be stabilized by separately determining the blur kernel for the area other than the edge area.

The high-frequency image information predicting and stabilizing apparatus 300 may predict a high-frequency component of an input image of an image sequence, such as video, to adjust overly-restored high-frequency components and restore a high-frequency component of a deteriorated input image by stabilizing the predicted high-frequency component to preserve an edge component.

The high-frequency image information predicting and stabilizing apparatus 300 may determine a restoration image in a current computation period by adding a high-frequency component restored in the current computation period to a restoration image determined in a previous computation period when iterating a computation period according to the iterative method. In this case, the high-frequency image information predicting and stabilizing apparatus 300 may apply a deterioration model to a previous restoration image restored in the previous computation period to model a blur image to which the first deterioration model or the second deterioration model is applied.

Figure 4:
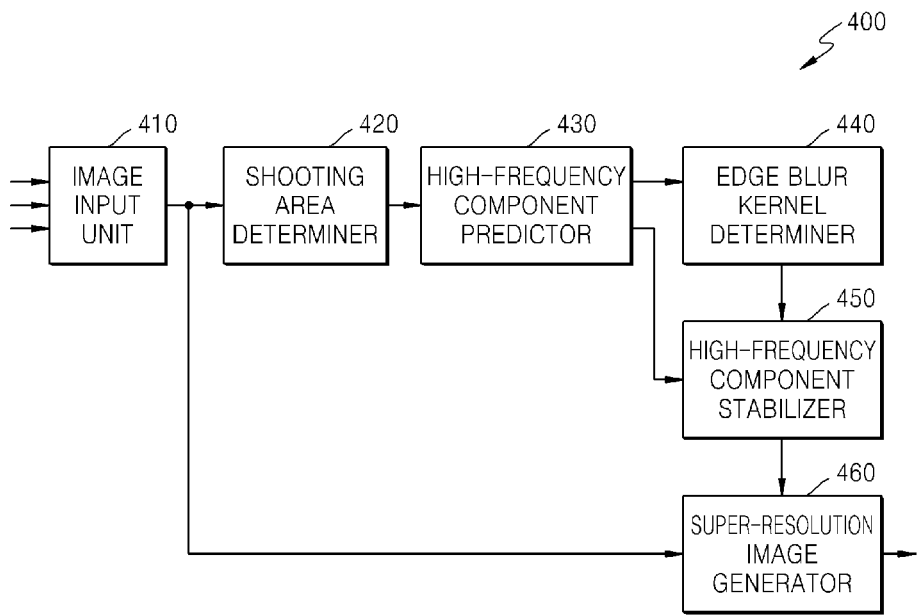
FIG. 4 is a block diagram of a super-resolution image generating apparatus according to an exemplary embodiment.

FIG. 4 is a block diagram of a super-resolution image generating apparatus 400 according to an exemplary embodiment.

Referring to FIG. 4, the super-resolution image generating apparatus 400 includes an image input unit 410, a shooting area determiner 420, a high-frequency component predictor 430, an edge blur kernel determiner 440, a high-frequency component stabilizer 450, and a super-restoration image generator 460.

The super-resolution image generating apparatus 400 determines a deterioration model and predicts a high-frequency component by using the deterioration model for every two or more input images. In addition, the super-resolution image generating apparatus 400 may generate a super-resolution image of an input image by restoring high-frequency image components with respect to the high-frequency components predicted for every input image and synthesizing all of the restored high-frequency components of the input images into an initial restoration image. The shooting area determiner 420, the high-frequency component predictor 430, the edge blur kernel determiner 440, and the high-frequency component stabilizer 450 may perform corresponding operations for each input image.

The image input unit 410 may receive two or more input images.

The shooting area determiner 420 may determine a shooting area of an input image for every input image. The shooting area determiner 420 may determine the first deterioration model for predicting high-frequency information of the input image and determine the shooting area in an initial restoration image generated by using the first deterioration model. The high-frequency component predictor 430 predicts a high-frequency component for each input image by using the first deterioration model determined by the shooting area determiner 420 and the second deterioration model.

The high-frequency component predictor 430 may determine a high-frequency component acquired by applying the first deterioration model to an area other than the shooting area in each input image as a predicted high-frequency component of a non-shooting area.

The high-frequency component predictor 430 may determine the second deterioration model for a shooting area in every input image. The high-frequency component predictor 430 may determine a high-frequency component acquired by applying the second deterioration model to the shooting area in each input image as a predicted high-frequency component of the shooting area.

The edge blur kernel determiner 440 determines an edge blur kernel for stabilizing a high-frequency component to be parallel to an edge direction of an image in order to determine a blur kernel for stabilizing a high-frequency image component for every input image. The edge blur kernel determiner 440 may determine the blur kernel for an image other than an edge area by using the first deterioration model or the second deterioration model. For example, the blur kernel may be determined as a kernel for the first deterioration model or the second deterioration model.

The edge blur kernel determiner 440 may determine the edge blur kernel so as to consider an edge direction independently of a deterioration model. The edge blur kernel determiner 440 may detect an edge area and an edge direction by predicting directivity of a current input image and determine the edge blur kernel for stabilizing a high-frequency component to be parallel to the edge direction.

For example, the edge blur kernel may be determined as a kernel having an area to which the kernel is applied, the area being long in parallel to the edge direction and narrow in a direction perpendicular to the edge direction.

The high-frequency component stabilizer 450 stabilizes a high-frequency component of each input image by using the edge blur kernel determined by the edge blur kernel determiner 440. For every input image, a high-frequency component of the edge area may be stabilized by using the edge blur kernel, and when the fundamental blur kernel is used, a high-frequency component of an area other than the edge area may be stabilized.

That is, through the shooting area determiner 420, the high-frequency component predictor 430, the edge blur kernel determiner 440, and the high-frequency component stabilizer 450, a high-frequency component for which the shooting effect is minimized may be predicted by using the deterioration models separately determined for the shooting area and the non-shooting area, and the high-frequency component may be stabilized to preserve an edge by using the blur kernel determined by considering the edge area and the edge direction.

The super-restoration image generator 460 generates super-restoration images with respect to two or more input images including a current input image by using high-frequency components stabilized by the high-frequency component stabilizer 450 for the two or more input images.

The super-restoration image generator 460 may generate magnified images of the input images of which a high-frequency component is stabilized, based on the number of input images of which a high-frequency component is stabilized. The super-restoration image generator 460 may generate super-restoration images by synthesizing the stabilized high-frequency components into the magnified images of the input images, respectively. For each input image, the stabilized high-frequency component may be synthesized by considering position matching of a magnified image of a corresponding input image.

The super-resolution image generating apparatus 400 may determine a restoration image in a current computation period by adding a high-frequency component restored in the current computation period to a restoration image determined in a previous computation period when iterating a computation period according to the iterative method. In this case, the super-resolution image generating apparatus 400 may apply a deterioration model to a previous restoration image restored in the previous computation period to model a blur image to which the deterioration model is applied.

Figure 5:
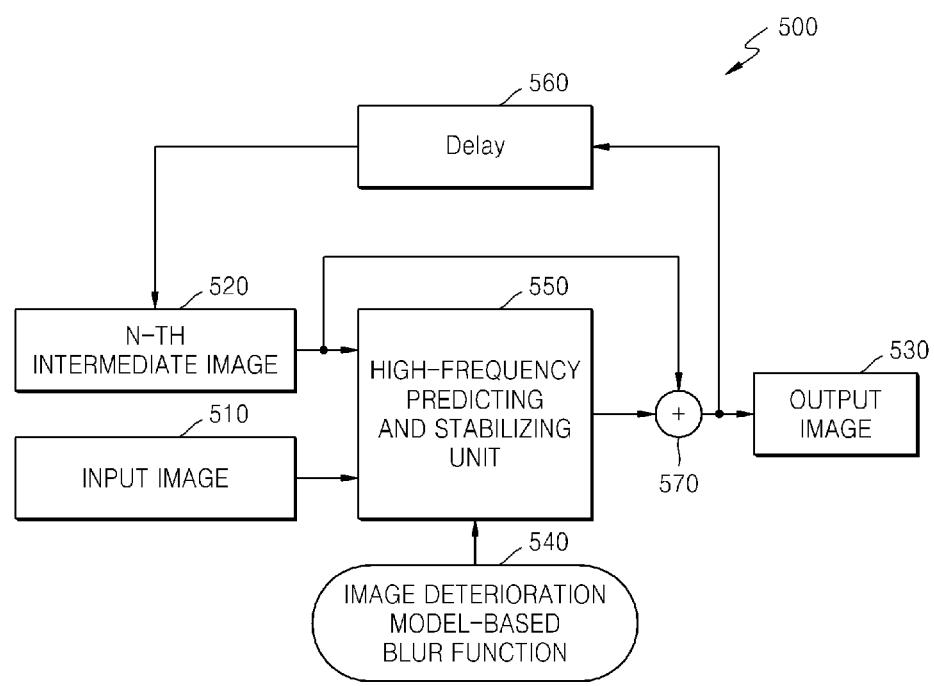
FIG. 5 is a conceptual diagram of an image restoration system using an iterative method.

FIG. 5 is a conceptual diagram of an image restoration system 500 using the iterative method.

Referring to FIG. 5, the image restoration system 500 generally restores a high-frequency component for an input image 510 to which noise is added after deteriorating an original image. Modeling the input image 510 is performed using Equation 1.

$$y = Hx + n \qquad (1)$$

Here, y denotes an input image, x denotes an original image, H denotes a PSF indicating a deterioration model, and n denotes noise.

The image restoration system 500 uses the iterative method to determine the original image x from Equation 1. By iteratively synthesizing a high-frequency component acquired from a high-frequency predicting process and a high-frequency stabilizing process of an image into the image, an output image 530 in which a high-frequency component of the original image is restored is determined.

That is, for image restoration using the iterative method, the output image 530 may be input as an intermediate restoration image 520 for a subsequent computation via a delay unit 560. As a result of adding (refer to 570) a high-frequency component acquired using the input image 510 and the intermediate restoration image 520 to the intermediate restoration image 520, the output image 530 is generated.

According to the iterative method, an operation of determining restoration images $x_k$ and $x_{k+1}$ with respect to the original image x may be expressed using Equation 2.

$$x_{k+1} = x_k + \beta H^T (y - Hx_k) \qquad (2)$$

Since k denotes an iterative phase, $x_k$ denotes the intermediate restoration image 520, and $x_{k+1}$ denotes a restoration image 530 to be output. $\beta$ denotes a phase value of the iterative method. $(y - Hx_k)$ corresponds to an image high-frequency predicting operation, and $H^T$ corresponds to an image high-frequency stabilizing operation.

The restoration image $x_{k+1}$ 530 to be output may be determined by adding a result ($H^T (y - Hx_k)$) obtained by applying a transpose matrix $H^T$ of a deterioration model to a predicted high-frequency component $(y - Hx_k)$ to the intermediate restoration image $x_k$ 520.

Here, since a high-frequency predicting and stabilizing unit 550 predicts the high-frequency component of the input image 510 based on a blur function 540 determined based on the deterioration model H of the input image 510 and stabilizes the high-frequency component using the deterioration model H, the deterioration model H is commonly used in the high-frequency component predicting and stabilizing processes.

Figure 6:
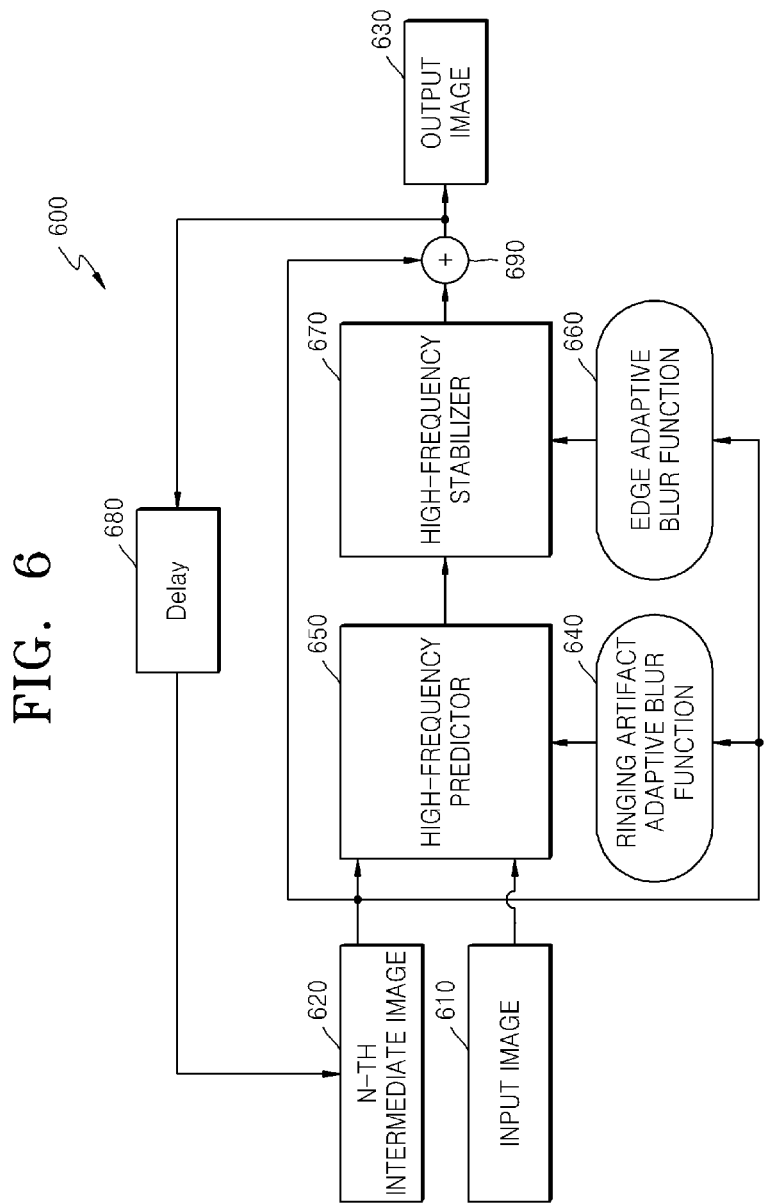
FIG. 6 is a conceptual diagram of an operation using the iterative method in a high-frequency image information predicting and stabilizing apparatus, according to an exemplary embodiment.

FIG. 6 is a conceptual diagram of an operation using the iterative method in a high-frequency image information predicting and stabilizing apparatus 600, according to an exemplary embodiment.

Referring to FIG. 6, the high-frequency image information predicting and stabilizing apparatus 600 may perform high-frequency predicting and restoring processes on an input image 610 by generating a restoration image 630 to be output as an intermediate restoration image 620 via a delay unit 680 by applying the iterative method to the high-frequency image information predicting and stabilizing apparatus 300.

An operation of determining a restoration image according to the iterative method in the high-frequency image information predicting and stabilizing apparatus 600 may be expressed using Equation 3.

$$x_{k+1} = x_k + \beta H^T_{edge}(y - H_{opt} x_k) \quad (3)$$

In Equation 3, $H_{opt}$ includes the second deterioration model determined to suppress the overly-restored high-frequency components and the first deterioration model, which are determined for corresponding areas, according to an exemplary embodiment. $H^T_{edge}$ includes an edge blur kernel for an edge area and a blur kernel for a general area, which are determined for corresponding areas, according to an exemplary embodiment. $H^T_{edge}(y - H_{opt} x_k)$ denotes a high-frequency component to be restored with respect to an input image. A (k+1)-th restoration image $x_{k+1}$ may be determined by adding the high-frequency component $H^T_{edge}(y - H_{opt} x_k)$ to a k-th restoration image $x_k$ according to the iterative method.

A high-frequency predictor 650 may determine a ringing-artifact adaptive blur function 640 based on the input image 610 or the intermediate restoration image 620. The ringing-artifact adaptive blur function 640 according to an exemplary embodiment may correspond to the second deterioration model for the shooting area according to an exemplary embodiment.

The ringing-artifact adaptive blur function 640 may include blur functions separately determined for a ringing-artifact-estimated area and its remaining area. A high-frequency component of each of the ringing-artifact-estimated area and its remaining area may be predicted by using the ringing-artifact adaptive blur function 640.

A high-frequency stabilizer 670 may determine an edge adaptive blur function 660 based on the input image 610 or the intermediate restoration image 620. A function corresponding to a transpose matrix of the edge adaptive blur function 660 according to an exemplary embodiment may correspond to a blur kernel obtained by considering an edge direction for an edge area according to an exemplary embodiment.

The edge adaptive blur function 660 may include blur functions separately determined for the edge area and its remaining area. A high-frequency component of each of the edge area and its remaining area may be stabilized by using the function corresponding to the transpose matrix of the edge adaptive blur function 660.

In order for the high-frequency image information predicting and stabilizing apparatus 600 to perform image restoration using the iterative method, the output image 630 may be the intermediate restoration image 620 for a subsequent computation via the delay unit 680. Again, the output image 630 may be generated (as a result of adder 690) by predicting, by the high-frequency predictor 650, a high-frequency component of each input image 610 and the intermediate restoration image 620 for areas identified by considering ringing artifacts and restoring, by the high-frequency stabilizer 670, the high-frequency component for areas identified by considering an edge component.

Figure 7:
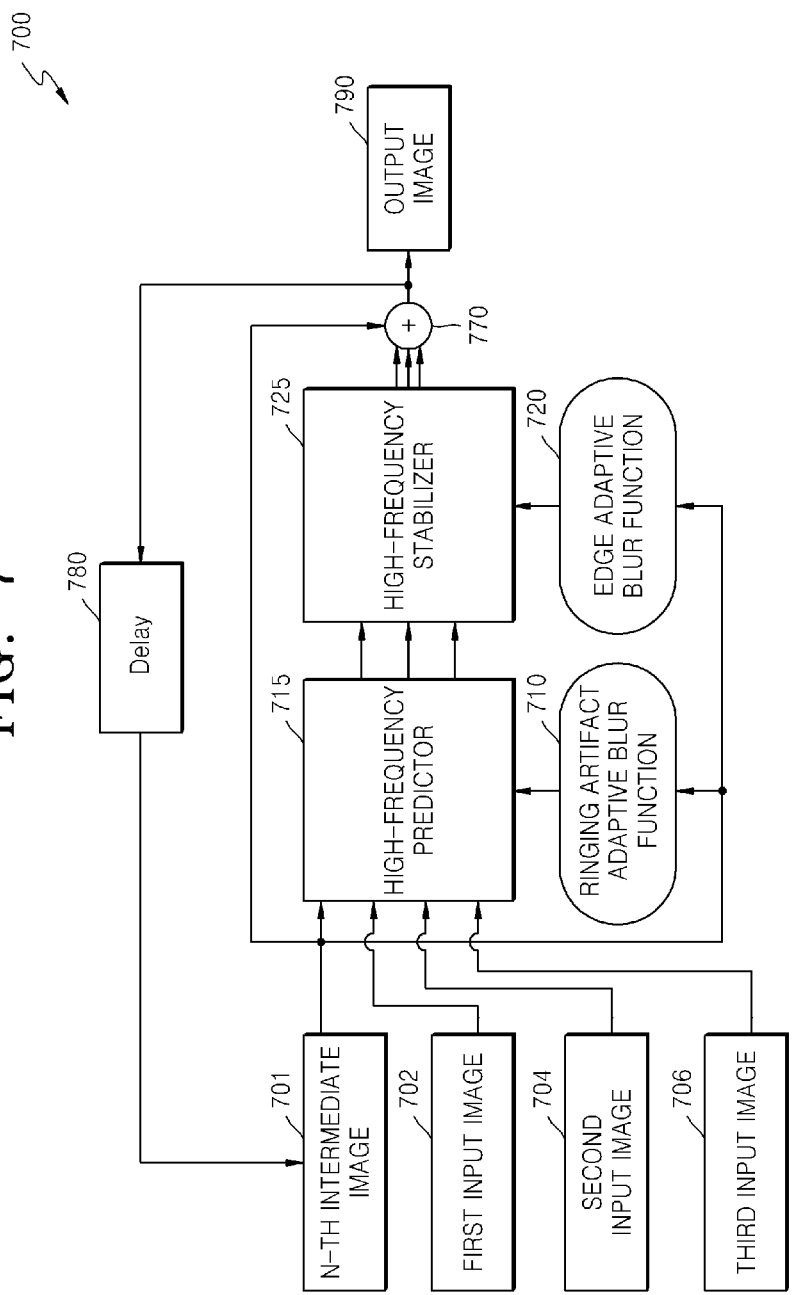
FIG. 7 is a conceptual diagram of an operation using the iterative method in a super-resolution image generating apparatus, according to an exemplary embodiment.

FIG. 7 is a conceptual diagram of an operation using the iterative method in a super-resolution image generating apparatus 700, according to an exemplary embodiment.

Referring to FIG. 7, the super-resolution image generating apparatus 700 may be another embodiment of the super-resolution image generating apparatus 400. While the super-resolution image generating apparatus 400 generates a super-resolution image by using two or more input images, in the case of FIG. 7, for convenience of description, the super-resolution image generating apparatus 700 outputs a super-resolution image 790 by using first, second, and third input images 702, 704, and 706.

For each of the first, second, and third input images 702, 704, and 706, a high-frequency component may be predicted for areas identified by considering ringing artifacts, and the high-frequency component may be stabilized for areas identified by considering an edge component.

That is, a ringing-artifact adaptive blur function 710 and an edge adaptive blur function 720 may be determined by using a previously restored intermediate image 701. A high-frequency predictor 715 may classify the first input image 702 into a ringing-artifact area and its remaining area by using the ringing-artifact adaptive blur function 710 and predict a first high-frequency component for each of the ringing-artifact area and its remaining area. A high-frequency stabilizer 725 may classify the first input image 702 into an edge area and its remaining area by using the edge adaptive blur function 720 and stabilize the first high-frequency component for each of the edge area and its remaining area by restoring the first high-frequency component.

Similarly, the high-frequency predictor 715 may predict a second high-frequency component of the second input image 704 for each of the ringing-artifact area and its remaining area by using the ringing-artifact adaptive blur function 710. The high-frequency stabilizer 725 may stabilize the second high-frequency component of the second input image 704 for the edge area and its remaining area by restoring the second high-frequency component by using the edge adaptive blur function 720.

Likewise, the high-frequency predictor 715 may predict a third high-frequency component of the third input image 706 for each of the ringing-artifact area and its remaining area by using the ringing-artifact adaptive blur function 710. The high-frequency stabilizer 725 may stabilize the third high-frequency component of the third input image 706 for the edge area and its remaining area by restoring the third high-frequency component by using the edge adaptive blur function 720.

The super-resolution image generating apparatus 700 may form a super-resolution image 790 to be output by synthesizing (refer to 770) the first, second, and third high-frequency components restored for the first, second, and first to third input images 702, 704, and 706 into the intermediate restoration image 701.

The super-resolution image generating apparatus 700 may also use a currently generated super-resolution image 790 as an intermediate image 701 for generating a subsequent super-resolution image 790 by delaying the currently generated super-resolution image 790 via a delay unit 780 in order to generate a super-resolution image 790 by restoring a high-frequency image component using the iterative method.

The first, second, and third high-frequency components predicted and stabilized by the high-frequency predictor 715 and the high-frequency stabilizer 725 may be sub-pixel-unit high-frequency components of magnified images of the first, second, and third input images 702, 704, and 706. Thus, the super-resolution image generating apparatus 700 may generate a super-resolution image having a magnified size rather than the first, second, and third input images 702, 704, and 706.

An operation of determining a restoration image according to the iterative method in the super-resolution image generating apparatus 700 may be expressed using Equation 4.

$$x_{k+1} = x_k + \beta \Sigma_i W^T_{edge,i}(y_i - W_{opt,i}x_k) \tag{4}$$

In Equation 4, $W_{opt,i}$ denotes a deterioration model in an expanded form including the second deterioration model determined to suppress the overly-restored high-frequency components according to an exemplary embodiment and a position matching relationship between a current input image and another input image. $W^T_{edge,i}$ denotes a high-frequency stabilization model in an expanded form including a high-frequency stabilization kernel determined to stabilize a high-frequency component together with removing the blur effect by considering an edge direction according to an exemplary embodiment and the position matching relationship between the current input image and another input image.

$W^T_{edge,i}(y_i - W_{opt,i}x_k)$ denotes a high-frequency component to be restored for each input image. Since i denotes the number of input images, according to Equation 4, a super-resolution image may be determined by predicting high-frequency components of every input image, stabilizing a high-frequency component of an edge portion by considering an edge direction while stabilizing the predicted high-frequency components, and adding the stabilized high-frequency components determined for every input image to a current pixel value.

In addition, a (k+1)-th super-resolution image $x_{k+1}$ may be determined by adding the high-frequency component $W^T_{edge,i}(y_i - W_{opt,i}x_k)$ for each input image to a k-th super-resolution image $x_k$ according to the iterative method.

Thus, for a plurality of input images, a super-resolution image may be acquired by predicting high-frequency components of the input images to minimize ringing artifacts according to an exemplary embodiment, stabilizing the high-frequency components according to an edge direction, and synthesizing the stabilized high-frequency components determined for the input images according to position matching relationships of the input images.

Figure 8:
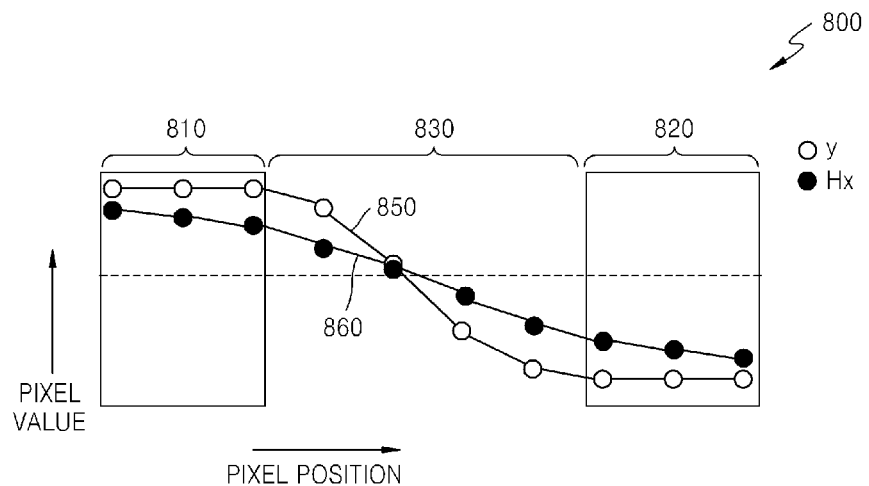
FIG. 8 illustrates a shooting effect, which may occur in a high-frequency image information predicting process.

FIG. 8 is a graph 800 illustrating an area in which the shooting effect is estimated to occur in a high-frequency component predicting process.

Referring to FIG. 8, the graph 800 shows pixel values of consecutive pixels in an actually deteriorated input image y 850 and a blur image Hx 860 estimated through the first deterioration model.

An image restoration scheme obtains a high-frequency component by applying the same blur according to deterioration modeling in the overall area.

A difference between the deteriorated input image y 850 and the blur image Hx 860 estimated through the first deterioration model is predicted as a high-frequency component of an input image y and an original image x. This high-frequency component predicted based on a deterioration model may be used to restore a damaged high-frequency component and an edge component in the input image y.

Due to the high-frequency component predicted based on a deterioration model, detail information in a high-frequency area 830 may increase. However, if a high-frequency component predicted in boundary areas 810 and 820 of a restored edge is excessive, a high-frequency component may be overly restored, thereby generating ringing artifacts.

Figure 9:
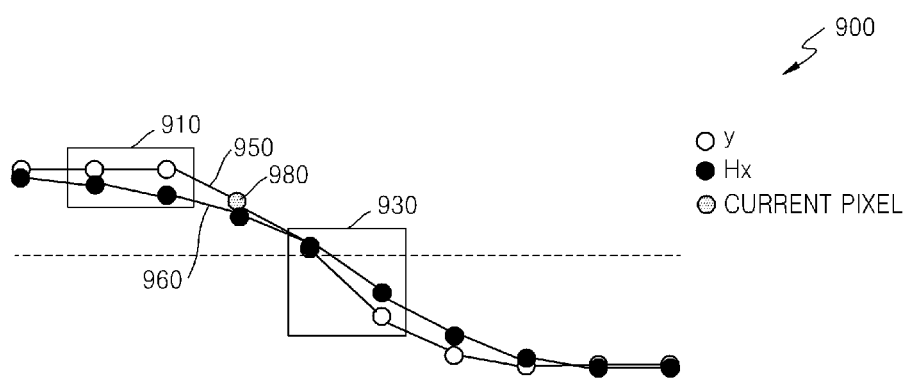
FIG. 9 illustrates deterioration models determined by considering the shooting area and the shooting effect, according to an exemplary embodiment.

FIG. 9 is a graph 900 illustrating deterioration models determined by considering a shooting area and the shooting effect, according to an exemplary embodiment.

The high-frequency image information predicting apparatus 100, the high-frequency image information predicting and stabilizing apparatus 300, and the super-resolution image generating apparatus 400 may predict a high-frequency component by identifying an area in which the shooting effect is estimated to occur and its remaining area and applying different deterioration models to the areas to suppress ringing artifacts due to the shooting effect of the overly-restored high-frequency components according to the areas based on a high-frequency image component predicting method according to an exemplary embodiment.

According to the high-frequency image component predicting method according to an exemplary embodiment, an area in which the shooting effect is estimated to occur may be determined as a shooting area. The second deterioration model for a shooting area detected according to an exemplary embodiment may be determined not to excessively predict a high-frequency component compared with the first deterioration model for its remaining area.

Referring to FIG. 9, the graph 900 shows pixel values of consecutive pixels located at an edge boundary area of an actually deteriorated input image y 950 and a blur image Hx 960 estimated through a first deterioration model 930.

For example, in a current pixel 980 of the input image y 950, pixels on the left are located in an edge boundary area and pixels on the right are located in an edge inside area. According to the high-frequency image component predicting method according to an exemplary embodiment, the edge boundary area may be determined as a shooting area.

Thus, based on the high-frequency image component predicting method according to an exemplary embodiment, a second deterioration model 910 to suppress the overly-restored high-frequency components may be determined as a deterioration model for the edge boundary area, and the first deterioration model 930 to effectively predict the high-frequency component may be determined as a deterioration model for the edge inside area.

According to the high-frequency image component predicting method according to an exemplary embodiment, to suppress the overly-restored high-frequency components of a high-frequency component predicted by using the second deterioration model 910, a deterioration area 910 of the second deterioration model 910 may be determined to be narrower than a deterioration area 930 of the first deterioration model 930.

According to the high-frequency image component predicting method according to an exemplary embodiment, a high-frequency component may be predicted so that ringing artifacts are suppressed and detail information is increased by determining deterioration models for a shooting area and its remaining area.

According to the high-frequency image component predicting method according to an exemplary embodiment, a shooting area may be determined by using pixel values of an initial restoration image of which a high-frequency component is restored according to the first deterioration model.

For example, according to the high-frequency image component predicting method according to an exemplary embodiment, a current pixel of the initial restoration image is compared with neighboring pixels, and if a current pixel value is outside a range of neighboring pixel values, the current pixel may be estimated as an area in which a high-frequency component may be overly restored.

The minimum value $x_{min}$ and the maximum value $x_{max}$ of the pixel value range of the neighboring pixels may be determined using Equation 5.

$$x_{min} = \min\{x_n, \text{mean}\{x_n\}\}$$

$$x_{max} = \max\{x_n, \text{mean}\{x_n\}\} \quad (5)$$

In Equation 5, $x_{min}$ and $x_{max}$ denote the minimum value and the maximum value of a neighboring pixel group, respectively, and $x_n$ denotes pixel values of a group of neighboring pixels within a predetermined range of the current pixel. For example, $x_{min}$ and $x_{max}$ may be defined from among the current pixel and a neighboring pixel group including 4 neighboring pixels located in the up, down, left, and right directions of the current pixel.

Mean$\{x_n\}$ denotes a mean value of value pixels in the neighboring pixel group, i.e., a mean pixel value of the neighboring pixel group. The influence of noise may be prevented by comparing the pixel values $x_n$ of the neighboring pixel group with the mean pixel value mean $\{x_n\}$.

Equation 6 shows an example of determining a deterioration model for each area based on the high-frequency image component predicting method according to an exemplary embodiment.

$$H_{opt} = \begin{cases} H_{model} & x_{min} < x_{rest} < x_{max} \\ H_{small} & \text{otherwise} \end{cases} \quad (6)$$

In Equation 6, $x_{rest}$ denotes an initial restoration estimated value restored through high-frequency component prediction, and $H_{opt}$ denotes a deterioration model determined in each pixel. $H_{model}$ denotes the first deterioration model for a general area, and $H_{small}$ denotes the second deterioration model for a shooting area.

According to Equation 6, in the high-frequency image component predicting method according to an exemplary embodiment, if the initial restoration estimated value $x_{rest}$ is within the range between $x_{min}$ and $x_{max}$ that is the pixel value range of the neighboring pixel group, a current pixel may be determined as a pixel in the general area in which the shooting effect does not occur, thereby determining the first deterioration model as a deterioration model for the current pixel. However, if $x_{rest}$ is outside a range between $x_{min}$ and $x_{max}$, i.e., less than $x_{min}$ or greater than $x_{max}$, the current pixel may be determined to be in an area in which a high-frequency component may be overly restored, thereby determining the second deterioration model for the shooting area as a deterioration model for the current pixel.

Based on the high-frequency image component predicting method according to an exemplary embodiment, a deterioration model for an initial restoration image may be named as $H_{opt}$ by determining a deterioration model according to an area corresponding to each pixel of the initial restoration image. Finally, a high-frequency component predicted from each pixel of the initial restoration image may be expressed with $y - H_{opt}x$.

Since the shooting area determining scheme and the deterioration model determining scheme according to Equations 5 and 6 relate to only one of various embodiments to implement the high-frequency image component predicting method according to an exemplary embodiment, the principle of the is not limited thereto.

Figure 10:
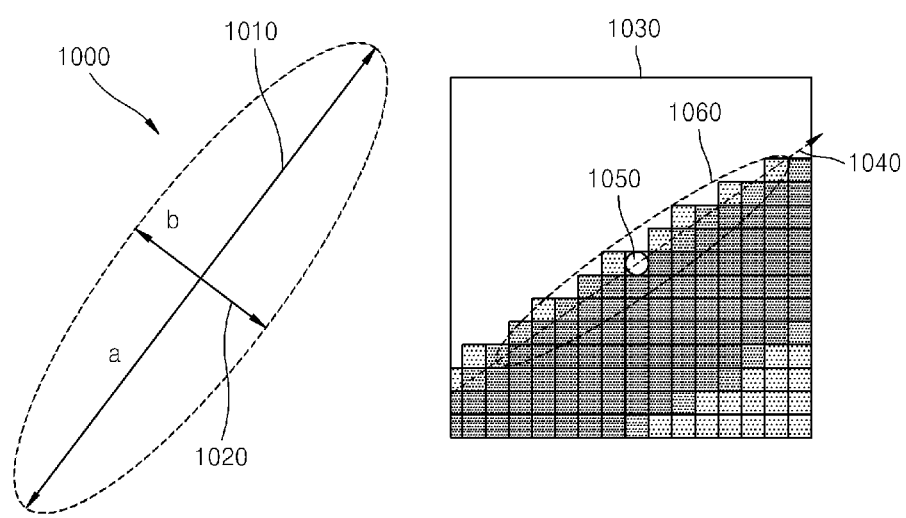
FIG. 10 illustrates a blur kernel determined by considering an edge area and an edge direction, according to an exemplary embodiment.

FIG. 10 illustrates a blur kernel determined by considering an edge area and an edge direction, according to an exemplary embodiment.

A high-frequency image component stabilizing method according to an exemplary embodiment allows divergence of a predicted high-frequency component to be prevented and an optimal high-frequency component to be determined by stabilizing a high-frequency component of an input image. A blur kernel used to stabilize and restore a high-frequency component is a function corresponding to a transpose matrix of a blurring kernel of a deterioration model.

Isotropic kernels are used as the general blurring kernel and the corresponding general blur kernel. In this case, a weight of the blur kernel may be determined with a predetermined value according to a distance apart from a current pixel from which the blur effect is removed.

However, if the current pixel is located at an edge boundary, a kernel may be applied in parallel to an edge direction due to the blur kernel that is an isotropic kernel and may also be applied in a direction perpendicular to the edge direction. When the kernel is applied in the direction perpendicular to the edge direction, a high-frequency component to be restored for the current pixel is determined by calculating a mean value of a high-frequency component to be restored in an edge area and a high-frequency component to be restored in a smooth area, resulting in damage to a high-frequency component of the edge area.

Thus, the high-frequency image information stabilizing apparatus 200, the high-frequency image information predicting and stabilizing apparatus 300, and the super-resolution image generating apparatus 400 determine a blur kernel by discriminating an edge area and a general area that is not the edge area based on the high-frequency image component stabilizing method according to an exemplary embodiment. According to the high-frequency image component stabilizing method according to an exemplary embodiment, a high-frequency component of an image may be restored together with preserving an edge component by preventing damage to the edge component by using a blur kernel considering an edge direction in an edge area and performing stabilization using a general blur kernel in a general area.

According to the high-frequency image component stabilizing method according to an exemplary embodiment, an edge area and an edge direction may be detected, and a blur kernel may be determined based on the edge direction. The edge area and the edge direction may be detected based on a covariance relationship of pixels.

According to the high-frequency image component stabilizing method according to an exemplary embodiment, a high-frequency component of an image may be restored by detecting an edge area and an edge direction based on a covariance relationship of pixels and determining a blur kernel by considering the edge direction. A scheme for determining a blur kernel by using a covariance matrix for an edge area is illustrated with reference to Equations 7 to 9.

$$CM = \begin{bmatrix} g_h \cdot g_h & g_h \cdot g_v \\ g_h \cdot g_v & g_v \cdot g_v \end{bmatrix} = \begin{bmatrix} A & B \\ C & D \end{bmatrix} \quad (7)$$

In Equation 7, $g_h$ and $g_v$ denote a gradient component in a horizontal direction of an image and a gradient component in a vertical direction, respectively. Thus, a matrix CM is a covariance matrix for determining a 2D gradient in horizontal and vertical directions of the image.

$$[x\ y] \cdot \begin{bmatrix} A & B \\ C & D \end{bmatrix} \cdot \begin{bmatrix} x \\ y \end{bmatrix} = 1 \quad (8)$$

$$A \cdot x^2 + (B+C) \cdot xy + D \cdot y^2 = 1 \quad (9)$$

According to Equations 8 and 9, an oval equation may be determined by applying a covariance matrix to a current pixel (x, y). According to a high-frequency image component restoring method according to an exemplary embodiment, a blur kernel 1000 may be determined by using an oval equation determined using a covariance matrix.

A length "a" of a long axis 1010 and a length "b" of a short axis 1020 of the blur kernel 1000 having an oval shape may be determined by components A, B, C, and D of the covariance matrix CM. That is, based on a covariance relationship of a current pixel, the blur kernel 1000 according to the oval equation of Equation 9 may be an isotropic kernel in which the length "a" of the long axis 1010 is similar to the length "b" of the short axis 1020 or an anisotropic kernel in which the length "a" of the long axis 1010 is longer than the length "b" of the short axis 1020.

An edge boundary image 1030 illustrates a case where a current pixel 1050 is located on an edge boundary. When a blur kernel for the current pixel 1050 is determined using the covariance matrix CM, an oval-shaped edge blur kernel 1060 in which a long axis of the oval is parallel to an edge direction 1040 and a short axis thereof is perpendicular to the edge direction 1040 may be formed based on a covariance relationship between the current pixel 1050 and its neighboring pixels.

That is, the determined blur kernel may be applied to components in an area which comprises a first diagonal axis in a direction parallel to the edge direction and a second diagonal axis in a direction perpendicular to the edge direction. Since, the first diagonal of the area to which the blur kernel is applied is longer than the second diagonal, the blur kernel may be applied to relatively more components located in the direction parallel to the edge direction and relatively less components located in a direction perpendicular to the edge direction. Thus, the components located in a direction perpendicular to the edge direction may be less blurred and the edge may be preserved.

Since the blur kernel 1000 determined according to the covariance matrix and the oval equation with reference to Equations 8 and 9 is only one of various embodiments to implement a high-frequency image component predicting and restoring method according to an exemplary embodiment, the exemplary embodiment is not limited thereto.

The high-frequency image information predicting and stabilizing apparatus 300 and the super-resolution image generating apparatus 400 may restore a high-frequency image component by applying a blur kernel to a high-frequency component predicted based on the high-frequency image component predicting method according to an exemplary embodiment.

In general, in an image restoring method based on prediction of a high-frequency image component, a high-frequency component of an image is restored by applying a kernel corresponding to a transpose matrix of a deterioration model used to predict the high-frequency component to a predicted high-frequency component.

Equation 10 is a blur kernel $H_{model}^{T}$ for high-frequency component restoration, which may be used to restore a high-frequency component by using a transpose matrix of a deterioration model $H_{opt}$ for high-frequency component prediction.

$$H_{model}^{T}(y - H_{opt}x_k) \quad (10)$$

That is, in a general image restoring method, the deterioration model $H_{opt}$ for high-frequency component prediction and the blur kernel $H_{model}^{T}$ for high-frequency component restoration have a transpose matrix relationship.

However, when the deterioration model $H_{opt}$ used for high-frequency component prediction is an isotropic kernel, the blur kernel $H_{model}^{T}$ for high-frequency component restoration is also determined as an isotropic kernel. If an isotropic blur kernel is applied to an edge area, i.e., an area in which a high-frequency component is strong in a predetermined direction, the high-frequency component that is strong in the predetermined direction cannot be restored well.

Thus, the high-frequency image information predicting and stabilizing apparatus 300 and the super-resolution image generating apparatus 400 may determine separate blur kernels so as not to damage an edge component of an edge area by discriminating the edge area from a general area according to a high-frequency image component predicting and stabilizing method according to an exemplary embodiment.

According to the high-frequency image component predicting and stabilizing method according to an exemplary embodiment, a blur kernel may be determined based on a deterioration model determined in a high-frequency component predicting process in an area other than the edge area. For example, a blur kernel corresponding to a transpose matrix of the deterioration model may be determined as the blur kernel for the area except for the edge area.

According to the high-frequency image component predicting and stabilizing method according to an exemplary embodiment, a blur kernel based on an edge direction may be determined regardless of the deterioration model determined in the high-frequency component predicting process in the edge area.

Equation 11 illustrates a high-frequency component restored using an edge blur kernel $H_{EKernel}^{T}$ for high-frequency component stabilization of an edge area independently to the deterioration model $H_{opt}$ for high-frequency component prediction, based on the high-frequency image component predicting and stabilizing method according to an exemplary embodiment.

$$H_{EKernel}^{T}(y - H_{opt}x_k) \quad (11)$$

As described above, the edge blur kernel $H_{EKernel}^{T}$ according to an exemplary embodiment may include an oval-shaped kernel having a long axis parallel to an edge direction and a short axis perpendicular to the edge direction.

Thus, in the high-frequency image component stabilizing method according to an exemplary embodiment and the high-frequency image component predicting and stabilizing method according to an exemplary embodiment, since a blur kernel for providing a general blur effect is applied in parallel to an edge direction and a blur kernel in a shape for preserving a high-frequency component of an edge component is used perpendicular to the edge direction, damage to the high-frequency component of the edge component in a predicted high-frequency component may be minimized.

The high-frequency image information predicting apparatus 100, the high-frequency image information stabilizing apparatus 200, the high-frequency image information predicting and stabilizing apparatus 300, or the super-resolution image generating apparatus 400 may be installed in an image acquisition device, such as a camcorder or a digital camera, to obtain a high-quality image by stabilizing a high-frequency component of an edge area together with removing the blur effect of an image signal generated by a sensor.

In addition, modules for implementing a high-frequency image information predicting method of the high-frequency image information predicting apparatus 100, a high-frequency image information stabilizing method of the high-frequency image information stabilizing apparatus 200, a high-frequency image information predicting and stabilizing method of the image high-frequency information predicting and stabilizing apparatus 300, and a super-resolution image generating method of the super-resolution image generating apparatus 400 may be installed in an image signal processing module of the image acquisition device.

In addition, the high-frequency image information predicting apparatus 100, the high-frequency image information stabilizing apparatus 200, the high-frequency image information predicting and stabilizing apparatus 300, or the super-resolution image generating apparatus 400 may be applied immediately before a reproducing operation of displaying an already acquired image.

For example, a video sequence may be acquired using a camcorder, and a still image may be acquired using a digital camera. The acquired images may be reproduced by a display device, such as a monitor or a TV. If the blur effect exists in an image acquired by the camcorder or the digital camera, image quality of the image reproduced by the display device may be deteriorated.

Thus, the high-frequency image information predicting apparatus 100, the high-frequency image information stabilizing apparatus 200, the high-frequency image information predicting and stabilizing apparatus 300, or the super-resolution image generating apparatus 400 may be installed in the display device to improve the image quality of the reproduced image.

In addition, modules for implementing the high-frequency image information predicting method according to an exemplary embodiment, the high-frequency image information stabilizing method according to an exemplary embodiment, the high-frequency image information predicting and stabilizing method according to an exemplary embodiment, and the super-resolution image generating method according to an exemplary embodiment may be installed in the display device or added to an image quality improving module of the display device to improve the image quality of the image reproduced by the display device.

Figure 11:
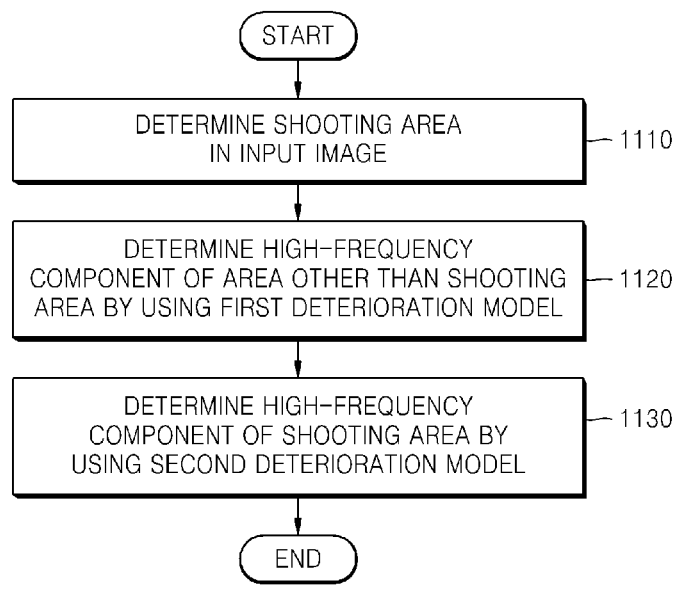
FIG. 11 is a flowchart illustrating a high-frequency image information predicting method according to an exemplary embodiment.

FIG. 11 is a flowchart illustrating a high-frequency image information predicting method according to an exemplary embodiment, which may operate in association with an image processor.

Referring to FIG. 11, in operation 1110, a shooting area that is a high-frequency area in which the high-frequency component is overly restored is determined in an input image. The first deterioration model for inversely predicting high-frequency information of the input image may be determined, and the shooting area in which it is likely that the high-frequency component is overly restored may be determined in an initial restoration image restored using the first deterioration model.

In operation 1120, a high-frequency component of an area other than the shooting area in the input image is determined using the first deterioration model. In operation 1130, a high-frequency component of the shooting area is determined using the second deterioration model.

When the high-frequency image information predicting method according to an exemplary embodiment is implemented based on the iterative method, a deterioration model may be applied to a previous restoration image restored in a previous computation period according to the iterative method.

To suppress the overly-restored high-frequency components of the shooting area, the second deterioration model may be determined separately from the first deterioration model. The shooting area and the second deterioration model may be determined using pixels of the initial restoration image in which a high-frequency component of the input image is restored using a high-frequency component predicted using the first deterioration model.

Thus, the high-frequency information of the input image may be predicted for the shooting area and the remaining general area by using the second deterioration model and the first deterioration model, respectively.

Figure 12:
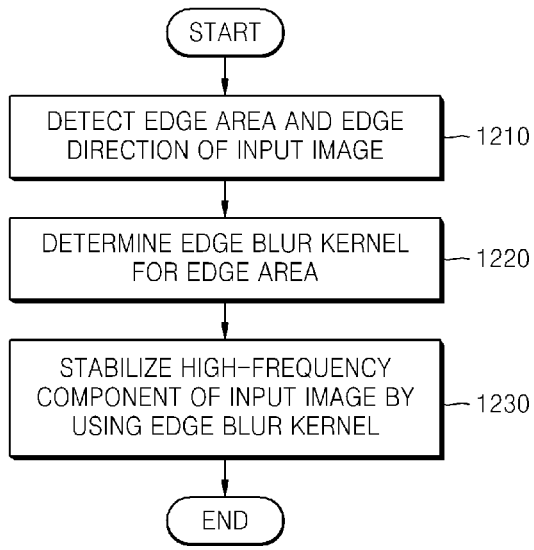
FIG. 12 is a flowchart illustrating a high-frequency image information stabilizing method according to an exemplary embodiment.

FIG. 12 is a flowchart illustrating a high-frequency image information stabilizing method according to an exemplary embodiment, which may operate in association with an image processor.

Referring to FIG. 12, in operation 1210, an edge area and an edge direction are detected by predicting directivity of an initial restoration image. When the high-frequency image information stabilizing method according to an exemplary embodiment is implemented based on the iterative method, a deterioration model may be applied to a previous restoration image restored in a previous computation period according to the iterative method.

In operation 1220, an edge blur kernel for restoring a high-frequency component of the edge area is determined in parallel to the edge direction. The edge blur kernel may be determined as a kernel in a shape in which an area to which the kernel is applied is long in a direction parallel to the edge direction and short in a direction perpendicular to the edge direction. An isotropic blur kernel may be determined for a general area except for the edge area.

In operation 1230, a high-frequency component of an input image is stabilized using the edge blur kernel. The image high-frequency information stabilizing method according to an exemplary embodiment may determine a blur kernel for stabilizing a high-frequency component predicted using a deterioration model. The high-frequency image information stabilizing method according to an exemplary embodiment may determine an edge blur kernel in a shape long in parallel to an edge direction and short in perpendicular to the edge direction independently to the deterioration model.

Figure 13:
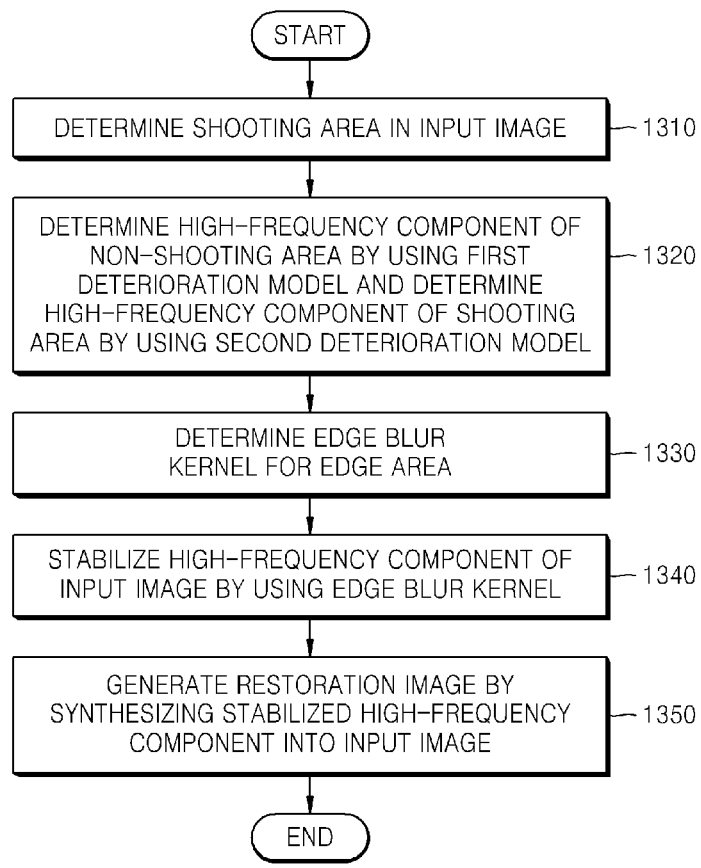
FIG. 13 is a flowchart illustrating a high-frequency image information predicting and stabilizing method according to an exemplary embodiment.

FIG. 13 is a flowchart illustrating a high-frequency image information predicting and stabilizing method according to an exemplary embodiment, which may operate in association with an image processor.

Referring to FIG. 13, in operation 1310, a shooting area is determined in an input image. The first deterioration model for predicting high-frequency information of the input image may be determined, and the shooting area may be determined in an initial restoration image restored using the first deterioration model.

In operation 1320, a high-frequency component of the input image is predicted by determining a high-frequency component of the non-shooting area (the area other than the shooting area) in the input image by using the first deterioration model and determining a high-frequency component of the shooting area in the input image by using the second deterioration model. When the high-frequency image information predicting and stabilizing method according to an exemplary embodiment is implemented based on the iterative method, the first or second deterioration model may be applied to a previous restoration image restored in a previous computation period according to the iterative method.

High-frequency components may be determined for the shooting area and the non-shooting area in the initial restoration image. A high-frequency component acquired by applying the first deterioration model to the non-shooting area may be determined as the high-frequency component of the non-shooting area, and a high-frequency component acquired by applying the second deterioration model to the shooting area may be determined as the high-frequency component of the shooting area.

Thus, by suppressing the overly-restored high-frequency components by using the second deterioration model in the shooting area in which a high-frequency component may be overly restored, the shooting effect in the high-frequency component predicted for the input image may be minimized.

In operation 1330, an edge blur kernel for stabilizing the high-frequency component is determined in parallel to an edge direction of the initial restoration image in order to determine a blur kernel for high-frequency component stabilization. The edge blur kernel may be determined by considering an edge direction of an edge area.

A blur kernel for an area other than the edge area may be determined based on the first deterioration model or the second deterioration model. The edge blur kernel determined by considering the edge direction of the edge area according to an exemplary embodiment may be determined as a kernel independently of the first deterioration model or the second deterioration model. The edge blur kernel may be applied to components in an area, the area comprising a first diagonal in a direction parallel to the edge direction and a second diagonal in a direction perpendicular to the edge direction, the first diagonal is longer than the second diagonal.

In operation 1340, the high-frequency component of the input image is stabilized using the edge blur kernel. The high-frequency component of the input image may be stabilized in the non-edge area while preserving an edge component in the edge area by using the edge blur kernel.

In operation 1350, a restoration image of which a high-frequency component is improved is generated by synthesizing a restored high-frequency component into the initial restoration image.

Figure 14:
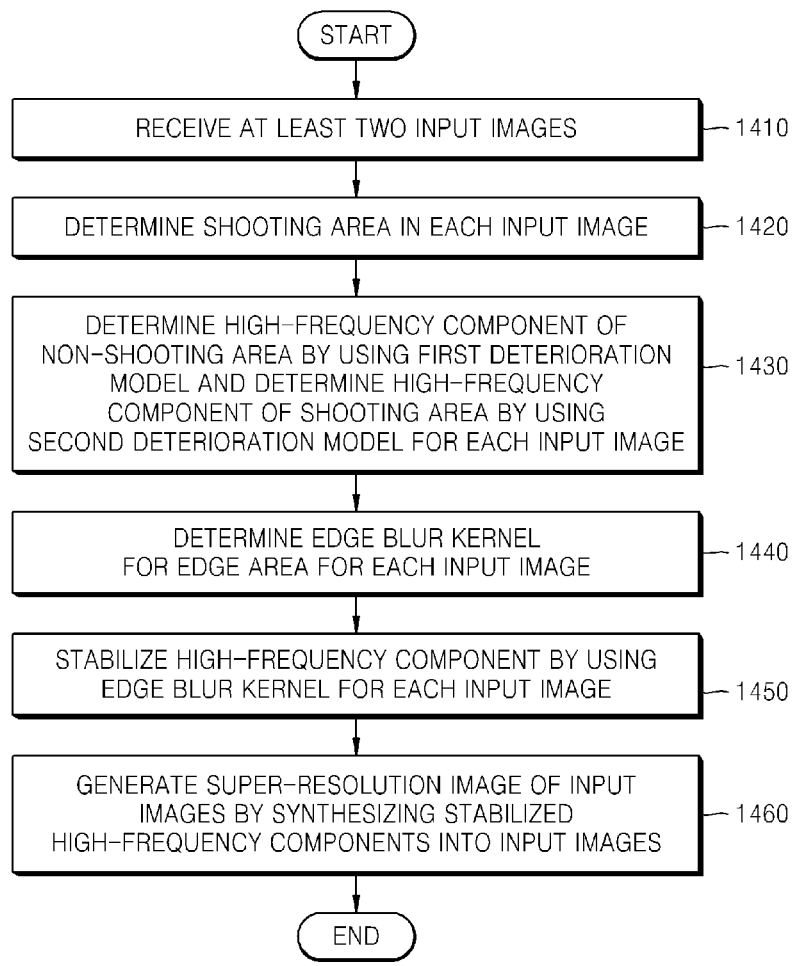
FIG. 14 is a flowchart illustrating a super-resolution image generating method according to an exemplary embodiment.

FIG. 14 is a flowchart illustrating a super-resolution image generating method according to an exemplary embodiment, which may operate in association with an image processor.

Referring to FIG. 14, in operation 1410, two or more input images are received. In addition, to model a blur image obtained by applying a deterioration model to an original image, the deterioration model may be applied to a previous restoration image restored in a previous computation period. The previous restoration image may be an image magnified in proportion to the number of input images.

In operation 1420, a shooting area is determined based on an initial restoration image for each of the input images. The first deterioration model for predicting high-frequency information of a current input image may be determined, and an area in which the high-frequency component is overly restored may be detected from the initial restoration image generated using the first deterioration model.

In operation 1430, a high-frequency image component is predicted for each of the input images by determining a high-frequency component of a non-shooting area by using the first deterioration model and determining a high-frequency component of the shooting area.

In operation 1440, an edge blur kernel for an edge area is determined for each of the input images by detecting the edge area from the initial restoration image. A high-frequency component may be stabilized in parallel to an edge direction so as not to damage an edge component in the initial restoration image.

In operation 1450, a high-frequency component of each of the input images is stabilized using the edge blur kernel. In operation 1460, a super-resolution image is generated with respect to the input images by using the stabilized high-frequency components of the input images. The super-resolution image may be an image magnified from the input images based on the number of input images. The stabilized high-frequency components of the input images may be synthesized by considering position matching of the two or more input images.

Thus, according to the high-frequency image information predicting method according to an exemplary embodiment and the high-frequency image information stabilizing method according to an exemplary embodiment, a high-frequency component restored to preserve a high-frequency component of an edge component as well as to suppress the occurrence of the shooting effect or ringing artifacts, may be generated. In addition, since a sub-pixel component of a magnified image may be restored by generating high-frequency components of every input image, a super-resolution image of which a high-frequency component is improved when magnifying the input images may be generated.

Various implementation examples, such as a high-frequency image component predicting technique for minimizing the shooting effect or ringing artifacts, which may occur in the high-frequency image component restoring process according to an exemplary embodiment, a high-frequency image component stabilizing technique for stabilizing a high-frequency component by considering an edge direction, a high-frequency image component predicting and stabilizing technique in which the high-frequency image component prediction according to an exemplary embodiment and the high-frequency image component stabilization according to an exemplary embodiment are combined, and a super-resolution image generating technique in which results of performing the high-frequency image component prediction and stabilization according to an exemplary embodiment for every input image by using a plurality of input images, have been disclosed with reference to FIGS. 1 to 14. However, since the above-described examples are only exemplary embodiments for describing the principle of the inventive concept, the exemplary embodiments are not limited to the forms disclosed in FIGS. 1 to 14.

It will be understood by those of ordinary skill in the art that the block diagrams disclosed in the exemplary embodiments conceptually represent circuits for implementing the principles of the inventive concept. Similarly, it will be recognized by those of ordinary skill in the art that arbitrary flowcharts, signaling diagrams, state transition diagrams, pseudo codes, etc. may be substantially represented in a computer-readable medium and indicate various processes executable by a computer or processor regardless of whether the computer or processor is explicitly shown. Thus, the exemplary embodiment can be written as computer programs and can be implemented in general-use digital computers that execute the programs by using a computer-readable recording medium. Examples of the computer-readable recording medium include storage media, such as magnetic storage media (e.g., ROM, floppy disks, hard disks, etc.) and optical recording media (e.g., CD-ROMs, or DVDs).

The functions of various elements shown in the drawings may be provided through the use of not only software-executable hardware but also exclusive hardware in association with appropriate software. In the case of providing those functions via a processor, those functions may be provided by a single exclusive processor, a single sharing processor, or a plurality of individual processors, some of which can be shared. The explicit use of the term "processor" or "controller" should not be analyzed as exclusively indicating software-executable hardware and may implicitly include digital signal processor (DSP) hardware, and read-only memory (ROM), random-access memory (RAM), and a non-volatile storage medium for storing software without any limitation.

In the claims of the specification, an element represented to perform a specific function may generally include an arbitrary scheme for performing the specific function, and the element may include an arbitrary type of software including firmware and micro-codes combined with a set of circuit elements for performing the specific function or a circuit suitable for software for performing the specific function.

'An exemplary embodiment' of the principles of the inventive concept and the designation of various modifications of this expression indicates that a specified feature, structure, and characteristic associated with the 'exemplary embodiment' may be included in at least one embodiment of the principles of the inventive concept. Thus, the expression 'in an exemplary embodiment' and other arbitrary modifications disclosed in the overall specification do not necessarily indicate the same embodiment.

In the specification, the expression 'at least one of' in a case of 'at least one of A and B' is used to generally include the selection of only the first option A, the selection of only the second option B, or the selection of both the options A and B. As an additional example, a case of 'at least one of A, B, and C' may generally include the selection of only the first option A, the selection of only the second option B, the selection of only the third option C, the selection of only the first and second options A and B, the selection of only the second and third options B and C, or the selection of all of the first, second, and third options A, B, and C. Even in a case of enumerating more options, it may be clearly expanded and analyzed by those of ordinary skill in the art.

While the inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the exemplary embodiment is defined not by the detailed description of the exemplary embodiments but by the appended claims, and all differences within the scope will be construed as being included in the exemplary embodiments.

What is claimed is:

1. A method of predicting high-frequency image information by using an image processor, the method comprising:
   estimating a shooting area, which is a high-frequency area that includes an overly-restored high-frequency component, in an input image;
   predicting a high-frequency component of an area other than the shooting area in
   the input image by using a first deterioration model; and
   predicting a high-frequency component of the shooting area by using a second deterioration model,
   wherein the first deterioration model and the second deterioration model are different from each other.

2. The method of claim 1, wherein the estimating of the shooting area comprises:
   determining the first deterioration model for removing a blur effect of the input image;
   generating an initial restoration image of the input image by applying the first deterioration model to the input image; and
   estimating the shooting area by detecting an area in which the high-frequency component is overly restored in the initial restoration image.

3. The method of claim 2, wherein the predicting of the high-frequency component of the shooting area by using the second deterioration model comprises:
   determining the second deterioration model for suppressing the overly-restored high-frequency component in the shooting area; and
   predicting the high-frequency component of the shooting area by applying the second deterioration model to the shooting area.

4. The method of claim 3, wherein the predicting of the high-frequency component of the shooting area comprises:
   acquiring a pixel deteriorated by performing blurring according to the second deterioration model for each pixel of the shooting area in the initial restoration image; and
   determining a difference component between the deteriorated pixel and a corresponding pixel of the input image as the high-frequency component of the shooting area.

5. The method of claim 2, wherein the predicting of the high-frequency component of the remaining area by using the first deterioration model comprises:
   acquiring a pixel deteriorated by performing blurring according to the first deterioration model for each pixel of the initial restoration image; and determining a difference component between the deteriorated pixel and a corresponding pixel of the input image as the high-frequency component.

6. The method of claim 2, wherein the estimating of the shooting area comprises:
   comparing a current pixel with a neighboring pixel in the initial restoration image;
   when an initial restored value of a current pixel is outside a range of initial restored values of the neighboring pixel based on a result of the comparing, predicting that the high-frequency component is overly restored in the current pixel and determining the current pixel as the shooting area.

7. The method of claim 1, further comprising determining the first deterioration model and the second deterioration model based on a previous restoration image restored in a previous computation period according to an iterative method and determining a high-frequency component in a current computation period.

8. A non-transitory computer-readable recording medium storing a computer-readable program for implementing the high-frequency image information predicting method of claim 1 by using a computation processor.

9. A method of stabilizing high-frequency image information by using an image processor, the method comprising:
   detecting an edge area and an edge direction of an input image;
   determining an edge blur kernel for stabilizing a high-frequency component of the edge area to be parallel to the edge direction; and
   stabilizing a high-frequency component of the input image by using the edge blur kernel.

10. The method of claim 9, wherein the determining of the edge blur kernel comprises determining the edge blur kernel to be applied to components in an area, the area comprising a first diagonal in a direction parallel to the edge direction and a second diagonal in a direction perpendicular to the edge direction, the first diagonal is longer than the second diagonal.

11. The method of claim 9, wherein the detecting of the edge area and the edge direction comprises determining the edge area in which the number of pixels increasing or decreasing regularly are consecutively arranged and determining the edge direction, based on a 2-dimensional covariance relationship between pixels in a predetermined area of an initial restoration image.

12. The method of claim 9, wherein the detecting of the edge area and the edge direction comprises determining the edge direction by using a covariance matrix including a horizontal gradient component of an initial restoration image and a vertical gradient component thereof, and the determining of the edge blur kernel comprises determining the edge blur kernel to have an oval shape having a long axis parallel to the edge direction and a short axis perpendicular to the edge direction based on the covariance matrix.

13. The method of claim 9, wherein the determining of the edge blur kernel comprises determining the edge blur kernel to be applied to components in an area, the area comprising a first diagonal in a direction parallel to the edge direction and a second diagonal in a direction perpendicular to the edge direction, the first diagonal is longer than the second diagonal, independently of a deterioration model.

14. The method of claim 9, further comprising determining a blur kernel and the edge blur kernel based on a previous restoration image determined in a previous computation period according to an iterative method and generating a current restoration image obtained by stabilizing a high-frequency component of the previous restoration image by using the blur kernel and the edge blur kernel.

15. A non-transitory computer-readable recording medium storing a computer-readable program for implementing the high-frequency image information stabilizing method of claim 9 by using a computation processor.

16. A method of predicting and stabilizing high-frequency image information by using an image processor, the method comprising:

estimating a shooting area, which is a high-frequency area which includes an overly-restored high-frequency component, in an input image;

predicting a high-frequency component of the input image by predicting a high-frequency component of an area other than the shooting area in the input image by using a first deterioration model and predicting a high-frequency component of the shooting area by using a second deterioration model;

determining an edge blur kernel for stabilizing a high-frequency component of an edge area to be parallel to an edge direction of the input image;

stabilizing the high-frequency component of the input image according to the edge direction of the edge area by using the edge blur kernel; and generating a restoration image by synthesizing the stabilized high-frequency component into the input image, wherein the first deterioration model and the second deterioration model are different from each other.

17. The method of claim 16, wherein the determining of the shooting area comprises:

determining the first deterioration model for removing a blur effect of the input image; and generating an initial restoration image of the input image by applying the first deterioration model to the input image and determining the shooting area by detecting an area in which a high-frequency component is overly restored in the initial restoration image, and wherein the predicting of the high-frequency component of the input image comprises:

predicting the high-frequency component of the shooting area by applying the first deterioration model to the area other than the shooting area in the initial restoration image; and determining the second deterioration model for suppressing the overly-restored high-frequency component in the shooting area and predicting the high-frequency component of the shooting area by applying the second deterioration model to the shooting area.

18. The method of claim 16, wherein the determining of the edge blur kernel comprises determining the edge blur kernel to be applied to components in an area, the area comprising a first diagonal in a direction parallel to the edge direction and a second diagonal in a direction perpendicular to the edge direction, the first diagonal is longer than the second diagonal, independently of the first or second deterioration model.

19. The method of claim 16, further comprising determining the first deterioration model, the second deterioration model, and the edge blur kernel based on a previous restoration image of which a high-frequency component is predicted and stabilized in a previous computation period according to an iterative method and generating a current restoration image obtained by stabilizing a super-resolution component of the previous restoration image.

20. A non-transitory computer-readable recording medium storing a computer-readable program for implementing the high-frequency image information predicting and stabilizing method of claim 16 by using a computation processor.

21. An apparatus for predicting high-frequency image information by using an image processor, the apparatus comprising:

a shooting area determiner which estimates a shooting area, which is a high-frequency area that includes an overly-restored high-frequency component, in an input image;

a non-shooting area high-frequency component determiner which predicts a high-frequency component of an area other than the shooting area in the input image by using a first deterioration model; and a shooting area high-frequency component determiner which predicts a high-frequency component of the shooting area by using a second deterioration model, wherein the first deterioration model and the second deterioration model are different from each other.

22. An apparatus for stabilizing high-frequency image information by using an image processor, the apparatus comprising:

an edge detector which detects an edge area and an edge direction of an input image;

an edge blur kernel determiner which determines an edge blur kernel for stabilizing a high-frequency component of the edge area to be parallel to the edge direction; and a high-frequency component stabilizer which stabilizes a high-frequency component of the input image by using the edge blur kernel.

23. An apparatus for predicting and stabilizing high-frequency image information by using an image processor, the apparatus comprising:

a shooting area determiner which estimates a shooting area, which is a high-frequency area which includes an overly-restored high-frequency component, in an input image;

a high-frequency component predictor which predicts a high-frequency component of the input image by predicting a high-frequency component of an area other than the shooting area in the input image by using a first deterioration model and predicting a high-frequency component of the shooting area by using a second deterioration model;

an edge blur kernel determiner which determines an edge blur kernel for stabilizing a high-frequency component of an edge area to be parallel to an edge direction of the input image;

a high-frequency component stabilizer which stabilizes the high-frequency component of the input image according to the edge direction of the edge area by using the edge blur kernel; and a restoration image generator which generates a restoration image by synthesizing the stabilized high-frequency component into the input image, wherein the first deterioration model and the second deterioration model are different from each other.

24. A method of generating a super-resolution image by using an image processor, the method comprising:

receiving a plurality of input images;

estimating a shooting area, which is a high-frequency area that includes an overly-restored high-frequency component, in each of the plurality of input images;

predicting a high-frequency component of an area other than the shooting area in each of the plurality of input images by using a first deterioration model and predicting a high-frequency component of the shooting area by using a second deterioration model;

determining an edge blur kernel for stabilizing a high-frequency component of an edge area to be parallel to an edge direction of an initial restoration image;

stabilizing a high-frequency component of each of the plurality of input images by using the edge blur kernel; and generating a super-resolution image of the initial restoration image by using the stabilized high-frequency component of each of the plurality of input images, wherein the first deterioration model and the second deterioration model are different from each other.

25. The method of claim 24, wherein the generating of the super-resolution image comprises:

generating magnified images of the input images based on a number of input images of which the high-frequency components are restored; and generating a super-resolution image of the input images by iteratively synthesizing the stabilized high-frequency components of the plurality of input images into the initial restoration image.

26. A non-transitory computer-readable recording medium storing a computer-readable program for implementing the super-resolution image generating method of claim 24 by using a computation processor.

27. An apparatus for generating a super-resolution image by using an image processor, the apparatus comprising:

an image input unit which receives a plurality of input images;

a shooting area determiner which estimates a shooting area, which is a high-frequency area which includes an overly-restored high-frequency component, in each of the plurality of input images;

a high-frequency component predictor which predicts a high-frequency component of each of the plurality of input images by predicting a high-frequency component of an area other than the shooting area in each of the plurality of input images by using a first deterioration model and predicting a high-frequency component of the shooting area by using a second deterioration model;

an edge blur kernel determiner which determines an edge blur kernel for stabilizing a high-frequency component of an edge area to be parallel to an edge direction of an initial restoration image;

a high-frequency component stabilizer which stabilizes a high-frequency component of each of the plurality of input images by using the edge blur kernel; and a super-resolution image generator which generates a super-resolution image of each of the plurality of input images by synthesizing the stabilized high-frequency component into each of the plurality of input images, wherein the first deterioration model and the second deterioration model are different from each other.

* * * * *